July 3, 1962
T. J. ALLEN
3,041,735
GAUGE
Filed April 13, 1959
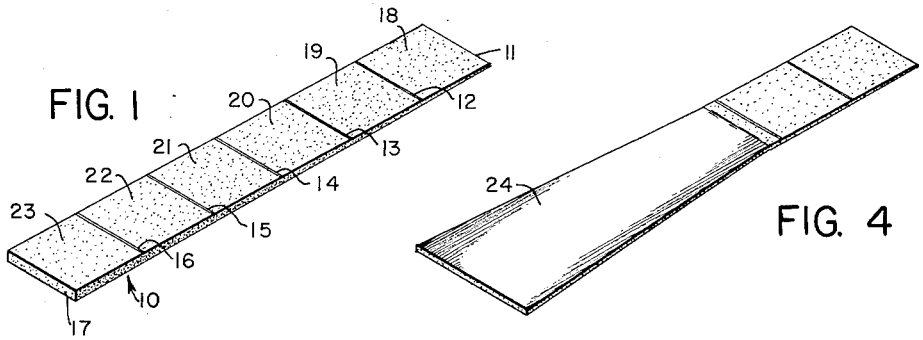
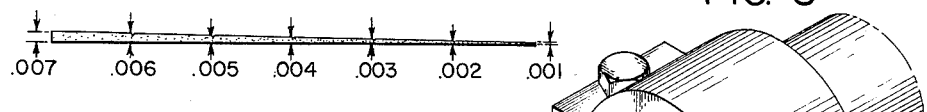
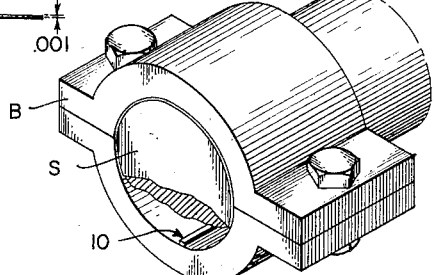
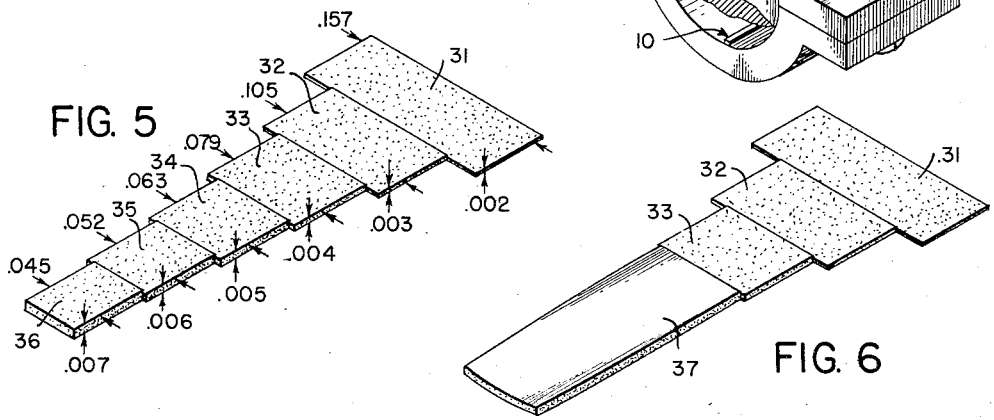
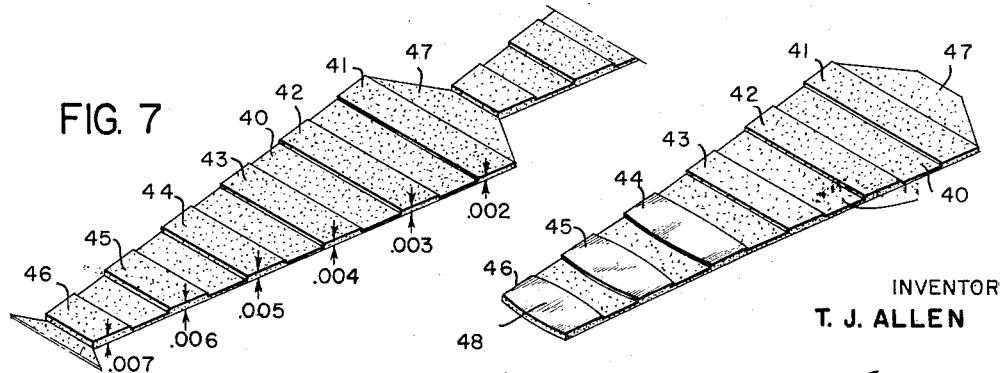
INVENTOR
T. J. ALLEN
ATTORNEY

United States Patent Office 3,041,735
Patented July 3, 1962

3,041,735
GAUGE
Thomas J. Allen, 323 El Modena Ave.,
Newport Beach, Calif.
Filed Apr. 13, 1959, Ser. No. 806,043
3 Claims. (Cl. 33—174)

This invention relates to measuring and more particularly to a device for accurately determining the clearance between a shaft and its bearing.

In the operation of vehicles, particularly automotive and trucks, it is necessary at intervals to replace or shim the bearings, or their inserts, in which certain shafts rotate because of wear thereon. In order to determine the necessity for and the extent of wear for which compensation must be made it is necessary to accurately determine the clearance between the shaft and the bearing. Such clearance may run from .001" to .007" and it is customary to determine it to the nearest .001".

Heretofore it has been the practice to place a piece of soft lead wire between the shaft and bearing and to rotate the shaft within the bearing sufficiently to flatten the wire. The wire is then removed and its thickness measured to determine the clearance.

Another procedure has been to insert one or more feeler gauges of metal having a predetermined thickness, until one which fits the opening is found. These procedures, however, require skilled use of a micrometer or other gauge thus necessitating the services and time of one having such skill, with the attendant possibility of errors in interpretation and in the communication of the information obtained.

According, it is an object of the present invention to provide a device for gauging the clearance between a shaft and its bearing and which does not require the time and attention of anyone skilled in the use of a micrometer nor in the use of any measuring device.

A further object of the invention is the provision of a device for gauging the clearance between a shaft and bearing and which provides a determination of such clearance upon inspection of the device after removal and without the necessity of measuring or comparing it to any other measuring instrumentality.

A further object of the invention is to provide a method for measuring the clearance between a shaft and bearing which permits persons unskilled in the use of measuring devices to make accurate determinations of such clearance quickly and easily.

These and other objects of the invention will become apparent from the following description taken in conjunction with the accompanying drawing in which:

FIG. 1 is a perspective to an enlarged scale, approximately 10:1, of one embodiment of the device in accordance with the present invention;

FIG. 2, a side elevation of the device of FIG. 1;

FIG. 3, a perspective on a reduced scale illustrating the positioning of the device between a shaft and its bearing;

FIG. 4, a perspective of the device of FIG. 1 illustrating its appearance after being pressed between a shaft and bearing of a certain clearance;

FIG. 5, a perspective to an enlarged scale of a modified form of a device in accordance with the present invention;

FIG. 6, a perspective of the device of FIG. 5 illustrating its appearance after being pressed between a shaft and bearing of a certain clearance;

FIG. 7, a perspective to an enlarged scale of a further modified form in accordance with the presence invention; and FIG. 8, a perspective of one of the segments of FIG. 7 illustrating its appearance after being pressed between a shaft and a bearing of a certain clearance.

Briefly stated, the present invention provides for a deformable member of graduated thickness covering a range in which the clearance to be measured is expected to lie, and having lateral indicia or divisions subdividing the member into portions of nominal predetermined thicknesses. In order to use the device it is placed flatwise between the shaft and bearing whose clearance is to be measured and the shaft rotated sufficiently with the bearing reassembled to flatten that portion of the device which is greater than the clearance. By inspection of the device the identity of the thickest unflattened portion, of predetermined thickness, is perceived.

With further reference to the drawing the device of FIGS. 1 to 5 is preferably formed from lead which is readily deformable such as, for example, that having a Brinell hardness number of 4.2.

The number 10 illustrated is preferably elongated and tapers in thickness from the end 11 of least thickness, to the end 17, of maximum thickness. In order that the approximate or nominal thickness of any portion of the device may be ascertained upon inspection the device is laterally subdivided by indicia such as score lines 12–16 into portions 18–23. The device that is illustrated may taper from .001" to .007" although various other dimensions may be employed depending upon the application. The device may be made of any convenient width.

In order to determine the clearance between a shaft S and a bearing B, as indicated in FIG. 3, the device is placed flatwise between the shaft and bearing and with the bearing assembled the shaft is turned back and forth a portion of a revolution. Assuming the clearance to be .003" the device will then have the appearance of FIG. 4. It will be observed that the part of the device having a thickness greater than .003" has been flattened to this thickness and that the upper surface 24 thereof has become shiny because of contact with the shaft, the remainder being unchanged in appearance. By inspection, the user of the device observes that, counting the end 11 as "one," the third score line from end 11 is the furtherest in the unchanged portion of the device from such end. Thus, the clearance is indicated as .003".

Instead of using score lines as indicia, other markings such as bands of varying shades, color, or texture may be employed.

FIGS. 5–6 illustrate a modified form of the invention in which, instead of providing a uniform taper, the device has stepped portions of varying thicknesses, each of which is of uniform thickness. In such embodiment the device has a base 30 and a top surface spaced therefrom by thicknesses which may vary, if desired, from .002" to .007" providing portions 31–36. These portions may vary in width from .157" to .045", as indicated, in order that each section may have approximately equal volume.

In use, the device of FIGS. 5–6 is placed flatwise between the shaft and the bearing, as previously described, thereby flattening any portions of it whose thickness exceeds the clearance. Assuming the thickness to be .005" the device will then appear similar to that of FIG. 6.

It will be observed that the sections 35 and 36, in FIG. 6, are flattened to .005" thickness and that the width of these sections becomes approximately equal to that of section 34. Since the shaft contacts sections 36, 35 and 34 the upper surface of these sections is made shiny, as indicated by the numeral 37, while the remaining sections are unchanged. By inspection, the user of the device observes that the shiny section nearest the end of least thickness is fourth from the end; knowing its predetermined thickness, in this case .005", he knows this to be the clearance.

FIGS. 7 and 8 illustrate a further modified form wherein the device is formed in a strip embodying a plurality of segments which are adapted to be detached one segment at a time. In this embodiment of the invention each segment is provided with a base portion 40 and a series of raised portions 41–46 separated by portions of lesser thickness and such raised portions or projections are of progressively increasing thickness as for instance .002 to .007, respectively. Each segment is tapered so that the raised portions 41 through 46 have approximately the same volume. Each segment is joined to the next succeeding segment in the strip by a weakened portion 47 so that one segment may be separated from the strip without disturbing the next succeeding segment.

In order to ascertain the clearance between a bearing and a shaft one segment may be separated from a strip, and such segment placed in a bearing axially of the shaft. The bearing is then tightened around the shaft and the shaft slowly rotated. Rotation of the shaft will cause a flattening of that part of the segment which is in direct contact with the shaft, so that upon removal of the segment from the bearing it may be observed which of the raised portions were flattened and are shiny through contact with the shaft, and which gives a true indication of the clearance between the bearing and the shaft.

In FIG. 8 it will be seen that the illustrated clearance between the bearing and the shaft is between .004 and .005 and raised portions 44–46 representing thicknesses of .005–.007 respectively, have been flattened and appear shiny, as indicated by the numeral 48.

The device may be made in various lengths and widths of a convenient size to use, depending upon a particular installation. In the examples illustrated it has been found convenient to employ a length of approximately ⅜″.

Accordingly, it will be understood that the invention includes the provision of a deformable member tapering in thickness and provided with lateral markings whereby the various portions of predetermined thickness may be readily identified, and whereby the device may have a portion thereof changed in appearance by reason of contact with the shaft and bearing whereby the clearance between the same may be determined upon inspection.

It will be obvious to those skilled in the art that various changes may be made in the embodiments of the invention described without departing from the spirit and scope thereof and that the invention is not limited to what is shown in the drawing and described in the specification but only as set forth in the following claims.

What is claimed is:

1. A device for measuring the clearance between a shaft and a bearing comprising a strip of detachable segments, each segment having a plurality of raised portions of predetermined thickness, said segment being tapered and said raised portions being of progressively increasing thickness and constant volume from a first end portion to a remote end portion, the range of thickness of said raised portions covering the anticipated clearance to be measured.

2. A device for measuring the clearance between a shaft and a bearing comprising a strip of detachable segments, said segments being joined by a weakened portion to aid in the detaching of a segment from said strip, each segment comprising a relatively soft elongated deformable member having a base and a plurality of raised portions of predetermined progressively increasing thickness from a first end portion to a remote end portion, said raised portions being substantially in spaced relation on said base and said member decreasing in width in ratio with the increase in thickness of said raised portions.

3. The measuring device of claim 2 in which said raised portions are separated by areas of less thickness.

References Cited in the file of this patent

UNITED STATES PATENTS

| | | |
|---|---|---|
| 2,486,446 | Teetor | Nov. 1, 1949 |
| 2,882,605 | Frauenholtz | Apr. 21, 1959 |